(12) United States Patent
Payne et al.

(10) Patent No.: US 7,376,211 B2
(45) Date of Patent: May 20, 2008

(54) HIGH SPEED EARLY/LATE DISCRIMINATION SYSTEMS AND METHODS FOR CLOCK AND DATA RECOVERY RECEIVERS

(75) Inventors: Robert Floyd Payne, Allen, TX (US); Richard Mark Prentice, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 10/766,161

(22) Filed: Jan. 28, 2004

(65) Prior Publication Data

US 2005/0163272 A1 Jul. 28, 2005

(51) Int. Cl.
*H04L 7/00* (2006.01)
(52) U.S. Cl. ..................... 375/354; 375/355
(58) Field of Classification Search ........ 375/354–361, 375/363, 371, 373–376; 327/141; 370/503, 370/506, 509
See application file for complete search history.

(56) References Cited

U.S. PATENT DOCUMENTS

| | | | |
|---|---|---|---|
| 5,572,158 A | 11/1996 | Lee et al. | |
| 5,757,218 A | 5/1998 | Blum | |
| 6,246,723 B1 | 6/2001 | Bliss et al. | |
| 6,370,212 B1* | 4/2002 | Nakai | 375/359 |
| 6,542,015 B2 | 4/2003 | Zhou et al. | |
| 6,693,985 B2* | 2/2004 | Li et al. | 375/355 |
| 6,920,622 B1* | 7/2005 | Garlepp et al. | 716/6 |
| 7,076,377 B2* | 7/2006 | Kim et al. | 702/66 |
| 2003/0198105 A1 | 10/2003 | Yamaguchi et al. | |

* cited by examiner

*Primary Examiner*—David C. Payne
*Assistant Examiner*—Rahel Guarino
(74) *Attorney, Agent, or Firm*—Alan K. Stewart; W. James Brady; Frederick J. Telecky, Jr.

(57) ABSTRACT

The present invention facilitates clock and data recovery for serial data streams by providing a mechanism that can be employed to detect and adjust operation and timing of clocks. The invention employs a differential analog circuit, using current steering logic, to process center and edge samples and identify an average operation of the clocks. The circuit can identify transitions between adjacent center/edge data samples and determine whether an identified transition is early or late for each bit in a set of consecutive bits of a received serial data stream.

7 Claims, 5 Drawing Sheets

HIGH SPEED EARLY/LATE DISCRIMINATION SYSTEMS AND METHODS FOR CLOCK AND DATA RECOVERY RECEIVERS

FIELD OF THE INVENTION

The present invention relates generally to serial high speed encoded data, and more particularly, to systems and methods that detect and correct clock operation in clock and data recovery receivers.

BACKGROUND OF THE INVENTION

With the increased speed of computers and the need for high performance peripherals, the use of high speed serial data communications applications in integrated circuits built to physically interface to any given bus has also increased. In the past, serial communication was typically regulated to relatively slow applications and components such as computer mice, modems, and the like. However, serial communication is now desired and employed in many areas of communication or data transfer. For example, high speed serial communication is employed for communication or data transfer to digital memory, optical communications, hard drive devices, digital video (e.g., digital video recorders), network devices, compact disk drives, digital video disk drives, digital cameras, and many more devices.

There are several common serial communication standards currently available, including USB (Universal Serial Bus) 1.1 that provides communication speeds up to 12 Mbps (Million bits per second), FireWire (IEEE 1394) that operates at 400 Mbps, and USB 2.0 that operates at a maximum of about 480 Mbps. The operational speeds of these standards have increased over time. For example, the speed of USB 2.0 versus USB 1.1 illustrates an improvement of over 40 times. State of the art optical networks used in data communications and telecommunications operates at bit rates up to 40 Gbps (billion bits per second).

Generally, serial communication includes a transmitter and a receiver. The transmitter encodes or modulates a lower speed parallel data bus into a higher speed serial data stream that is then placed on a communication media. The serial data stream travels on the communication media and is then obtained from the media by the receiver. The serial data stream is then processed by the receiver in order to decode or recover the original data and de-serialize the resulting data into a duplicate parallel data bus.

Figure 1:
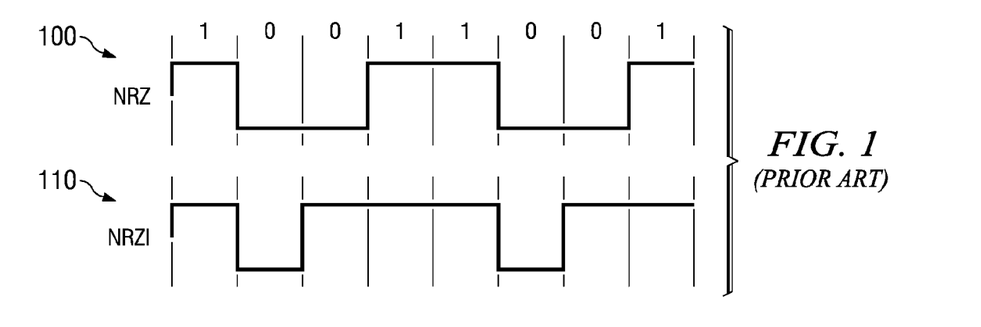
FIG. 1 is a diagram illustrating an example of NRZ and NRZI data encoding.

Several techniques exist to encode the serial data and many signaling approaches can be used to transmit the data. Encoding techniques are used to embed a guaranteed density of transitions in the data and to facilitate reconstruction of the parallel data bus at the receiver. An example of these encoding techniques is 8b-10b encoding used on the physical layer in Gigabit Ethernet, PCI-Express, Fibre Channel, and 1394. Another encoding method is referred to as scrambling, which is used in SONET (Synchronous Optical NETwork). At the lowest level, the signaling approach can be as simple as NRZ (non-return to zero) binary, where 0 bit is encoding as one voltage level and a 1 bit is encoding as a different voltage level. Another commonly employed serial encoding/decoding scheme is (Non-Return-to-Zero Inverted) encoded and bit stuffed. NRZI is a data transmission method in which the polarity of the bit is reversed whenever a 0 bit is encountered, and a static voltage level is transmitted whenever a 1 bit is encountered as illustrated in FIG. 1, and designated at reference numeral 110. NRZI thus uses the presence or absence of a transition to signify a bit (indicating a logical 0 by inverting the state). Combined with bit-stuffing, where an extra 0 bit is inserted after every six consecutive 1 bits, this data encoding causes a guaranteed transition every 7 bit times when a data payload would be all 1 bits. Every transition gives the CDR circuit phase information that it uses to align its recovered clock to the phase of the incoming data. The less time between transitions, the less phase error which is to be expected caused by frequency offset. Finally, the data can be transmitted using a multi-level signaling approach where multiple bits are encoding as multiple data levels and transmitted at a lower data rate. For example, if two bits are wished to be transmitted simultaneously at one half the equivalent data rate as the binary approach, four voltage levels can be assigned to the various bit combinations 00, 01, 10, an 11.

Figure 2:
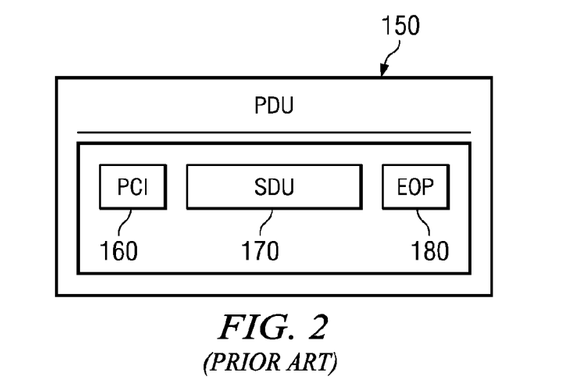
FIG. 2 is a diagram illustrating an exemplary structure of a serial data stream.

The structure of the data stream follows a specific communications protocol, which defines the rules for sending a block of data (each known as a Protocol Data Unit (PDU)) (e.g., 150 of FIG. 2) from one node in a network to another node. The exchanged PDUs comprises three parts: a sync sequence 160, a packet payload (also known as a Service Data Unit (SDU)) 170, and an End of Packet (EOP) 180. The protocol does not define or constrain the data carried in the payload portion 170 of the data block. The protocol does, however, specify the format of the sync sequence.

The incoming data stream may be at a different frequency than the receiving system. Each side can vary from an ideal frequency within a +/−delta range as limited by a ppm tolerance value or jitter tolerance value defined in a respective industry standard. Often, the source and receive frequencies are slightly different. Regardless of the relative source and destination frequencies, the incoming data stream shows all jitter components of an electrical transmission over a bandwidth limited media (e.g., data dependant cycle to cycle jitter).

Several techniques exist to recover and track the possibly asynchronous data at the inputs to a serial receiver. Because of slight variations in timing, operating frequency, and other non-ideal operating conditions present at sending and receiving ends, the recovered clock can become early or late over time. Generally, the recovered data should be obtained from data samples taken at a center of each bit time of an incoming data stream. However, the recovered data can become corrupted as the recovered clocks drift with respect to the data causes data samples to be taken at inappropriate times of the incoming serial data stream. Accordingly, it would be desirable to have systems and/or methods that monitor and correct recovered clock(s) in order to facilitate data and clock recovery of incoming or received serial data streams.

Two primary classes of clock recovery circuits exist: linear and binary (also called bang-bang). A linear clock and data recovery (CDR) circuit attempts to recover the original transmitting clock and data. A conventional CDR circuit attempts to recover the clock and data by utilizing a phase detector (PD) or alternatively a phase-frequency detector (PFD), and source a charge pump followed by a loop filter and the voltage controlled oscillator (VCO) of a phase locked loop (PLL). The phase detector detects the absolute timing error between the current recovered clock and the timing of the ideal clock and together with the charge pump, generates an error signal proportional to the size of the timing error. This error signal is filtered using a loop filter and used to drive the VCO.

A binary clock recovery system recovers the clock by examining the sign of the phase error between the current recovered clock and the data. If the recovered clock is too early, the clock recovery system delays the clock. If the recovered clock is too late, the clock is advanced.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates operation of clock and data recovery systems by providing systems and methods that facilitate detecting and adjusting clock operation to optimize data recovery. The present invention identifies an average early, late, or centered operation for a set of consecutive bit times. Based on the identified average operation, clocks can be sped up or slowed accordingly or left in the current position. The present invention identifies the average operation by employing a differential analog circuit that processes center and edge data samples and identifies whether individual transitions occur early or late and whether the plurality of transition samples were early, late, or the same. The processing is performed in parallel, which, as a result, permits high speed operation of clock and data recovery systems.

The present invention employs a number of voting components that operate in parallel to identify clock operations over a set of consecutive bit times. Individual voting components identify and indicate early, late, or neither operation of data and transition clocks for an individual bit time. Based on these indications, the present invention identifies the average operation over the set of consecutive bit times. Generally, each voting component selectively draws a reference current from an early node, a late node, or neither depending on if and when a transition is detected for a current center sample, a current edge sample, and a previous center sample. An early comparator compares a voltage resulting from current drawn from the voting components that indicates early operation with a voltage resulting from current drawn from the voting components that indicates late operation plus an additional amount of current, equal to ½ of the current from a single voting component. The early comparator then generates a digital output according to the comparison that indicates whether or not there are more identified early operations per bit time than late operations per bit time over the set of consecutive bit times. Additionally, a late comparator compares a voltage resulting from drawn current from the voting components that indicates late operation with a voltage resulting from drawn current from the voting components that indicates early operation plus an additional amount of current. The late comparator then generates a digital output according to the comparison that indicates whether or not there are more identified late operations per bit time than early operations per bit time over the set of consecutive bit times.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages, and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates clock and data recovery for serial data streams by providing a mechanism that can be employed to detect and adjust operation and timing of clocks. The invention employs a differential analog circuit, using current steering logic, to process center and edge samples and identify an average operation of the clocks. The circuit can identify transitions between adjacent center/edge data samples and determine whether an identified transition is early or late for each bit in a set of consecutive bits of a received serial data stream.

Figure 3:
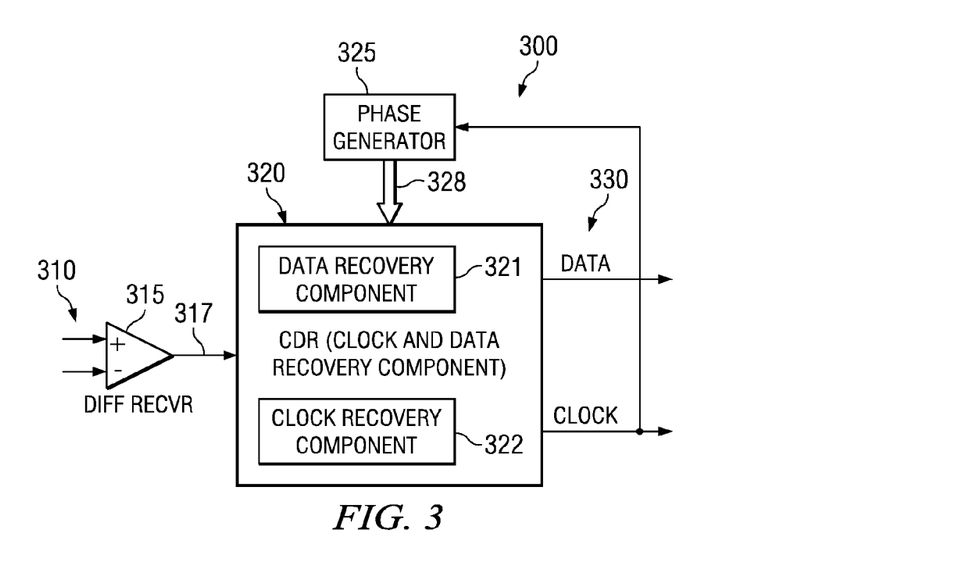
FIG. 3 is a diagram illustrating an exemplary clock and data recovery system in accordance with an aspect of the present invention.

FIG. 3 illustrates an exemplary CDR system 300, in which several aspects of the current invention may be accomplished. A received serial data stream 310 enters a receiver (e.g., or transceiver) 315 and outputs a buffered or amplified received serial data stream 317 into a CDR circuit 320. The received serial data stream 310 is encoded with a suitable encoding scheme such as NRZI encoding. A phase generator 325 generates a local clock signal running at approximately the same frequency as a transmitter clock utilized to initially generate the received serial data stream 310. The phase generator 325 produces multiple phases 328 of the clock signal which are supplied to the CDR circuit 320.

The clock phases 328 of the example, together with the single ended data stream 317 are input to the CDR circuit 320, which is operable to obtain a recovered clock and recovered data 330. The recovered clock and data 330 can then be provided to an electronic or computer device for further processing.

A data recovery component 321 samples and detects data stream transition(s) associated with the received serial data stream 310 and obtains the recovered data therefrom. A clock recovery component 322 is operable to recover one or more clocks associated with the recovered data. Although the data recovery component 321 and the clock recovery component 322 are illustrated separately in FIG. 3, these components can share common components and circuits, such as for identifying transitions/data toggles.

The CDR circuit 320 samples the data stream 317 ideally at the center and edges of each bit in the stream. A data clock is used to obtain samples at the center of each bit and a transition clock is used to obtain samples at the edges. Ideally, the center samples should be obtained at a center of each bit time of an incoming data stream and edge samples should be obtained at edges of each bit time. However, non-ideal operating conditions such as timing errors, slight variations in frequencies at sending and receiving ends, jitter, and the like can cause the data clock and the transition clock to be off such that the center samples are not obtained substantially at the center of each bit time and that the edge samples are not obtained substantially at the edges of each bit time. As a consequence, the recovered data can become corrupted as recovered clock drift causes data samples to be taken at inappropriate times of the incoming serial data stream if the timing of the data clock and the transition clock is not adjusted.

The CDR system 300 is a binary clock recovery system, also referred to as a "bang bang" type clock recovery system. The system 300 recovers the clock by examining the sign of the phase error between the current recovered clock and the data. If the recovered clock is too early, the clock recovery system delays the clock. If the recovered clock is too late, the clock is advanced.

The inventors of the present invention appreciate that in a given bit time, the data and transition clocks can be considered early if a difference is detected between a current data/center sample and a current edge sample, which is the edge sample taken immediately prior to the center sample. Similarly, the data and transition clocks can be considered late if a difference is detected between a current center sample and a previous center sample, and the current center sample is the same as the current edge sample. The clocks could be adjusted after every bit time after an early or late is detected; however such adjustment is complicated, can reduce operating speed, and can lead to erratic operating behavior. As a result, the present invention is operable to analyze a number or set of consecutive bit times to determine if the clocks are, on average, early or late. The number of bit times can vary according to implementation.

One suitable mechanism to determine whether the clocks are, on average, early or late is to "cast a vote" for each bit time in the set. The votes for early and late can then be counted to determine if there are more early or late votes or a tie between early and late votes. Then, based on that determination, the clocks can be adjusted accordingly. Logic components can be used to implement this mechanism, however such logic, particularly the depth of such logic, can degrade or prohibit high speed operation of the CDR. The clock recovery component 322 of the present invention employs a differential analog circuit that employs current steering logic to process the samples and perform an averaging operation, in parallel, to determine whether the clocks are early or late over a set of bit times.

Accordingly, the clock recovery component 322 analyzes the center and edge samples over a number of consecutive n bits, wherein n represents the number of consecutive bits (e.g., n=8) of the data stream to determine whether the clocks are early or late. If the clock recovery component 322 determines that the clocks are early, the clocks are then delayed slightly. If the clock recovery component 322 determines that the clocks are late, the clocks are then sped up slightly. Otherwise, the clocks are left in place. Further details of a suitable differential analog circuit that can be employed with the clock recovery component 322 are provided infra.

Figure 4:
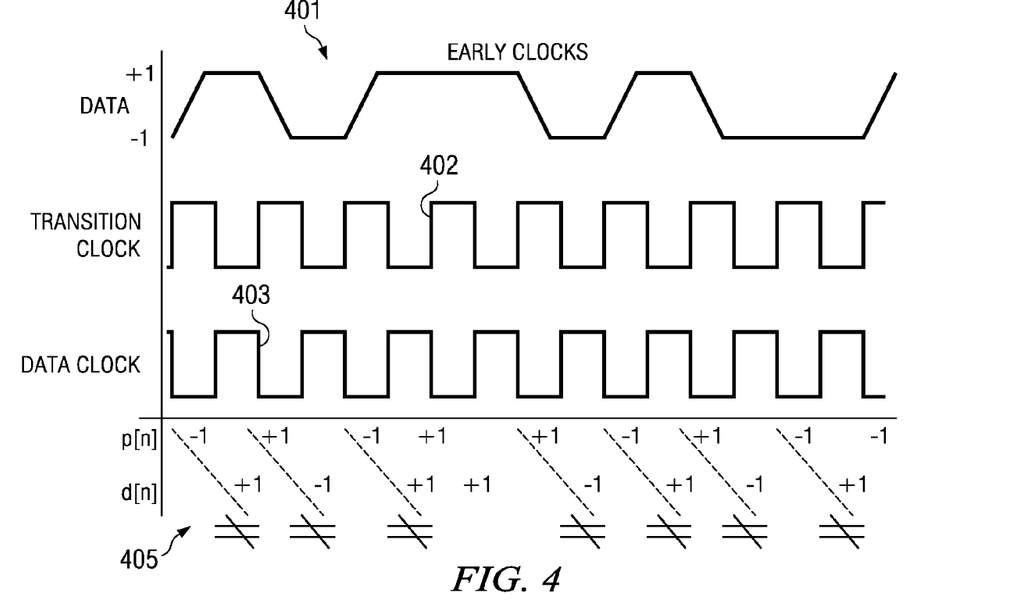
FIG. 4 is a timing diagram illustrating exemplary operation of a clock and data recovery component in accordance with an aspect of the present invention, wherein the clocks are early.

FIG. 4 is a timing diagram illustrating exemplary operation of a clock data recovery component in accordance with an aspect of the present invention, wherein the clocks are early. The diagram covers 8 consecutive bit times across an x-axis indicating increasing time as the signals traverse left to right and depicts a data stream 401, a transition clock 402, a data clock 403, and data samples (center d[n] and edge p[n]). The transition clock 402 is present to obtain the edge samples p[n] and the data clock 403 is present to obtain the data or center samples d[n]. The edge samples p[n] are obtained on rising edges of the transition clock 402 and the center samples d[n] are obtained on rising edges of the data clock 403. If the sign of the input data is positive when the clock edge rises, then a digital one is determined to have been received; if the sign of the input data is negative, then a digital zero is determined to have been received. As seen in the diagram, there are seven identified data transitions in the 8 bit times. Because the clocks are early, differences are detected between a current data sample and a current edge sample (the edge sample immediately prior to the current data or center sample), as indicated by 405. As a result, over these 8 bit times, a clock and data recovery component of the present invention would determine that the clocks are early and delay the clocks by some amount.

Figure 5:
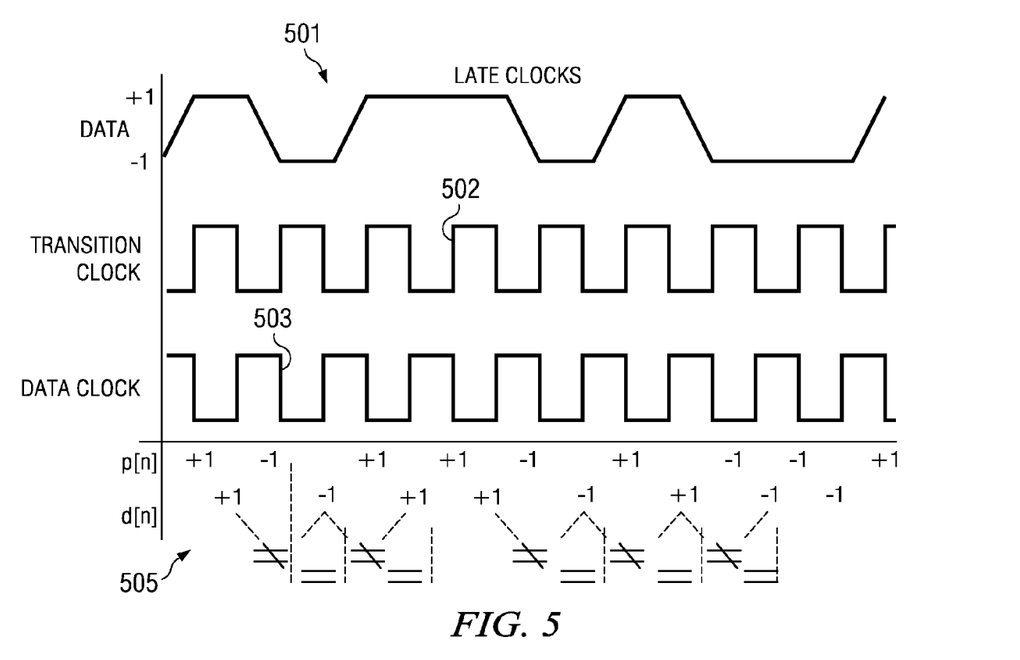
FIG. 5 is a timing diagram illustrating exemplary operation of a clock and data recovery component in accordance with an aspect of the present invention, wherein the clocks are late.

Turning now to FIG. 5, another timing diagram is provided illustrating exemplary operation of a clock and data recovery component in accordance with an aspect of the present invention, wherein the clocks are late. The diagram again covers 8 consecutive bit times across an x-axis and depicts a data stream 501, a transition clock 502, a data clock 503, and data samples (center d[n] and edge p[n]). The transition clock 502 is present to obtain the edge samples p[n] and the data clock 503 is present to obtain the data or center samples d[n]. Once again, the edge samples p[n] are obtained on rising edges of the transition clock 502 and the center samples d[n] are obtained on rising edges of the data clock 503. The data stream 501 is substantially identical to the data stream 401 of FIG. 4. However, the transition clock 502 and the data clock 503 are delayed or late with respect to the data. As a result, the transitions between edge samples and center samples are not identified until later than that of FIG. 4. Transitions are identified between current data sample and a previous data sample as indicated at 505 and the current data sample is the same as the current edge sample rather than different, as indicated in FIG. 4. As a result, over these 8 bit times, a clock data recovery component of the present invention would determine that the clocks are late and speed up the clocks by a number of steps. As seen in FIGS. 4 and 5, the present invention can identify early and late clocks and can adjust or compensate the clocks to correct them.

Figure 6:
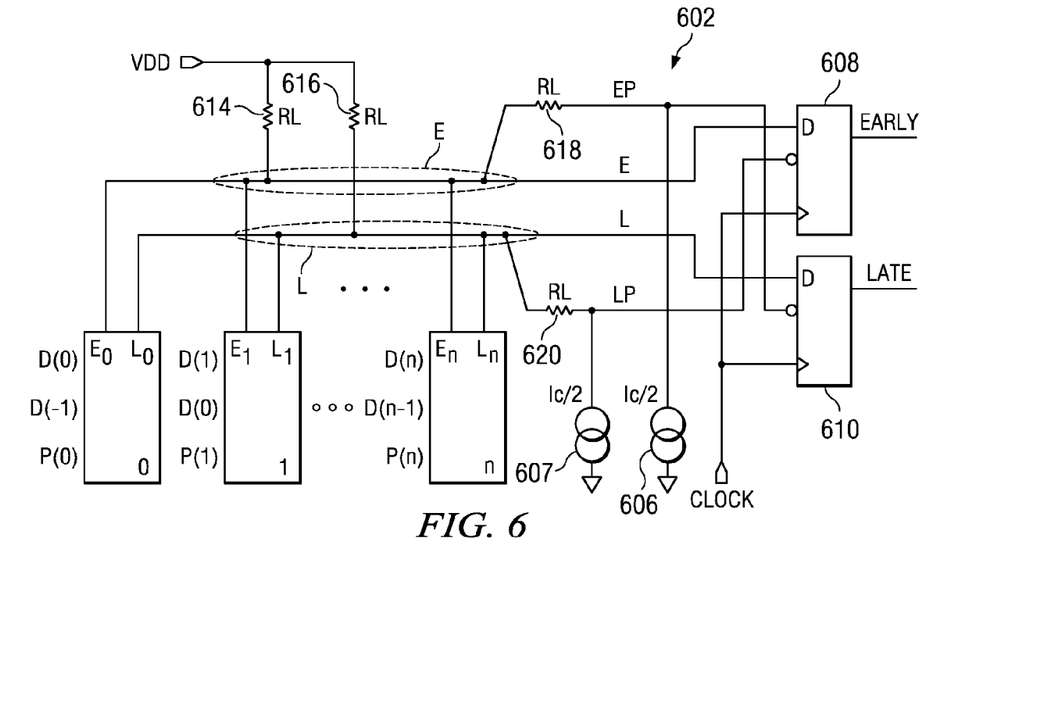
FIG. 6 is a schematic diagram of an early/late circuit in accordance with an aspect of the present invention.

FIG. 6 is a schematic diagram of an early/late circuit in accordance with an aspect of the present invention. The circuit is a differential analog circuit that uses current steering logic to process data samples and perform an averaging operation quickly and efficiently and can be employed in a clock and data recovery device. The circuit integrates the transition detector between adjacent data samples with a determination of whether the included transition sample was early or late for each pair of bits in the data stream. The determination of whether the plurality of bits were early or late is performed using differential sense amplifiers to evaluate a sign of a resulting sum of individual early/late decisions. Offsets are built in to the inputs of the sense amplifiers to provide three possible output states: early, late, or tied. The processing of the circuit is performed in parallel and the circuit only needs to determine whether the plurality of samples on average are early, late, or tied, instead of counting each and then averaging. As a result, the circuit can process a number of N data samples in a relatively short time, thereby permitting high speed operation of the CDR to be maintained.

The circuit includes a number of voting components 602, the number of which corresponds to a number of bit times to evaluate or average over. Each of the voting components 602 receive a current center sample D, a current edge sample P (the edge sample immediately prior to the current center sample, and a previous center sample (D from a prior bit time or voting component). From these samples, the voting components provide an early output ($E_n$) that is ON if the component detects that the clocks are early and a late output ($L_n$) that is ON if the component detects that the clocks are late. Otherwise, both the early and late output are OFF (e.g., such as for when there is no transition). The early outputs (E) of the voting components 602 are connected to a first resistor 614, which is connected to VDD, the positive supply rail of the circuit. This combination of these early outputs of the voting components is labeled E, which can be referred to as a composite early node, and has a voltage representative of the number of components that detected an early clock. Similarly, the late output of the voting components 602 are connected to a second resistor 616, which is also connected to VDD. Typically, the first resistor 614 and the second resistor 616 have similar resistance values (e.g., RL). The connection of the late outputs from the voting components 602 is referred to as a composite late node and labeled L, which has a voltage representative of the number of components that detected a late clock.

The voltages at nodes L and E vary according to the voting components 602. For outputs that are ON, the voting components draw a reference current of Ic through the corresponding outputs. So, for example, if 3 of the voting components cast early votes (i.e., 3 have E outputs ON), there is a voltage drop across the first resistor 614 of 3×Ic×RL, where RL is the resistance of the first resistor 614. Accordingly, in this example, the voltage at node E is equal to Vdd−3×Ic×RL. Thus, each vote causes a corresponding drop in voltage at the E or L nodes, respectively. If an output of the voting components 602 is OFF, no current is drawn and there is no drop in voltage at the relevant E or L node from that particular voting component. In summary, it is appreciated that the voting components draw a reference current Ic through one or none of its outputs (E and L).

Another node referred to as a composite early plus node and labeled EP is present and is connected to a reference current 606 and to the node E through a third resistor 618, which also has a resistance value in this example of RL. The reference current 606 in this example has a value of Ic/b 2. As a result, the node EP has a voltage representative of the number of components +½ that detected an early clock. As a result, the node EP has a voltage value that, due to the reference current 606, is always Ic/2×RL below the voltage value of the node E. Similarly, another node referred to as a composite late plus node and labeled LP is present and is connected to a reference current 607 and to the node L through a fourth resistor 620. The second reference current 607 in this example also draws a reference current equal to Ic/2 and the fourth resistor also has a resistance value of RL. As a result, the node LP has a voltage representative of the number of components +½ that detected a late clockAs a result, the node LP in this example has a voltage value that, due to the reference current 607, is always Ic/2×RL below the voltage value of the node L. The pair of added reference currents 606, 607 also shift the voltages at nodes E and L down by a factor of RL×Ic/2, but the resulting voltages at EP and LP are still smaller by RL×Ic/2.

An early comparator 608 is connected to and receives the node E and the node LP and provides a single output, labeled EARLY. The EARLY output is HIGH or ON if the node E, which is a voltage representative of the number of voting components that detected early clocks, is lower than the node LP, which is a voltage representative of the number of voting components that detected later clocks plus ½. Similarly, a late comparator 610 is connected to the node L and the node EP and provides a single output labeled LATE. The LATE output is HIGH or ON if the node L, which is a voltage representative of the number of voting components that detected late clocks, is lower than the node EP, which is a voltage representative of the number of voting components that detected earlier clocks plus ½. The early comparator 608 and the late comparator 610 are clocked on a clock signal operating at a suitable frequency (e.g., the frequency of received data divided by n, the number of bits being voted upon; this results in an evaluation every n bits).

As a first example, a set of bit times is analyzed by the circuit of FIG. 6 and "casts" 4 early votes and 2 late votes. This can occur if the clocks are predominantly early with respect to the serial data stream but non-idealities in the clock and data stream (jitter, for example) has caused a few of the samples to be determined late. The E node has a voltage representative of 4 early votes being cast and the LP node has a voltage representative of 2 and ½ votes being cast due to the presence of the reference current 607 and the fourth resistor 620, as described supra. As a result, the early comparator 608 generates the EARLY output as being HIGH because 4 is greater than 2 and ½ (the voltage of the node E is less than the voltage of the node LP). The L node has a voltage representative of 2 votes and the EP node has a voltage representative of 4 and ½. The late comparator 610 generates the LATE output as being LOW because 3 is not greater than 3 and ½.

As another example, a set of bit times is analyzed and "casts" 3 early votes and 3 late votes. The E node has a voltage representative of 3 early votes being cast and the LP node has a voltage representative of 3 and ½ votes being cast due to the presence of the reference current 607 and the fourth resistor 620, as described supra. As a result, the early comparator 608 generates the EARLY output as being LOW because 3 is not greater than 3 and ½ (the voltage of the node E is greater than the voltage of the node LP). The L node has a voltage representative of 3 votes and the EP node has a voltage representative of 3 and ½. The late comparator 610 generates the LATE output as being LOW because 2 is not greater than 4 and ½. Thus, when the number of early and late votes are equal, both the EARLY and LATE outputs are LOW and, as a result, the data and transition clocks are not adjusted.

Figure 7:
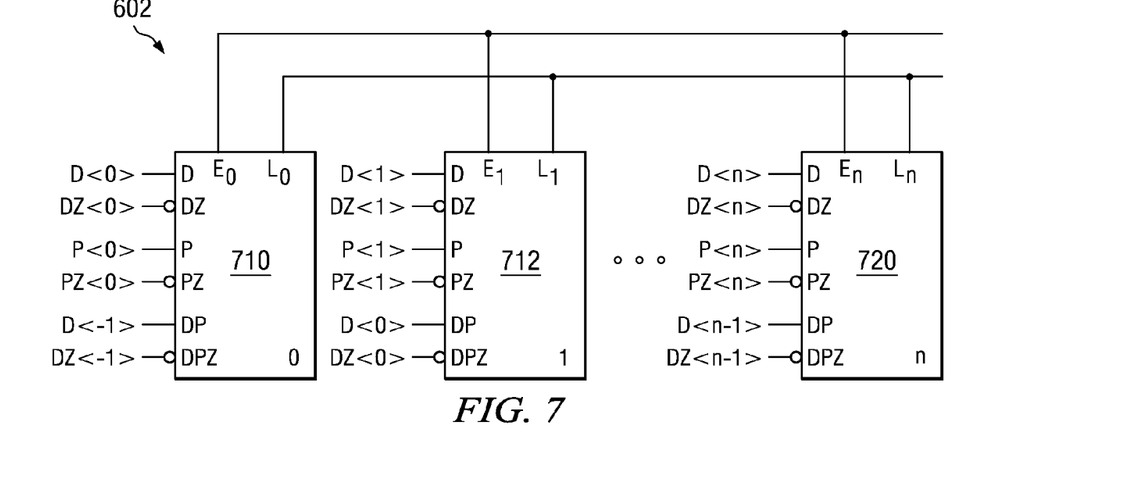
FIG. 7 is another schematic diagram of an early/late circuit in accordance with an aspect of the present invention.

FIG. 7 is another schematic diagram of an early/late circuit in accordance with an aspect of the present invention. The portion illustrated is a portion of the circuit of FIG. 6 showing more details of the voting components 602. There are "n" voting components present in this circuit. A first voting component 710 receives a current center sample D<0>, a current edge sample P<0>, and a previous center sample D<−1>. The first voting component 710 can also receive or generate a logical complement of the current center sample, DZ<0>, a logical complement of the current edge sample, PZ<0>, and a logical complement of the previous center sample DZ<−1>. The voting component generates early and/or late voltages according to the received center and edge samples. Other voting components, including a second voting component 712 and an $n^{th}$ voting component 720, are configured in a similar manner. In this case, D<1>corresponds to the data sample taken a single bit time later.

Figure 8:
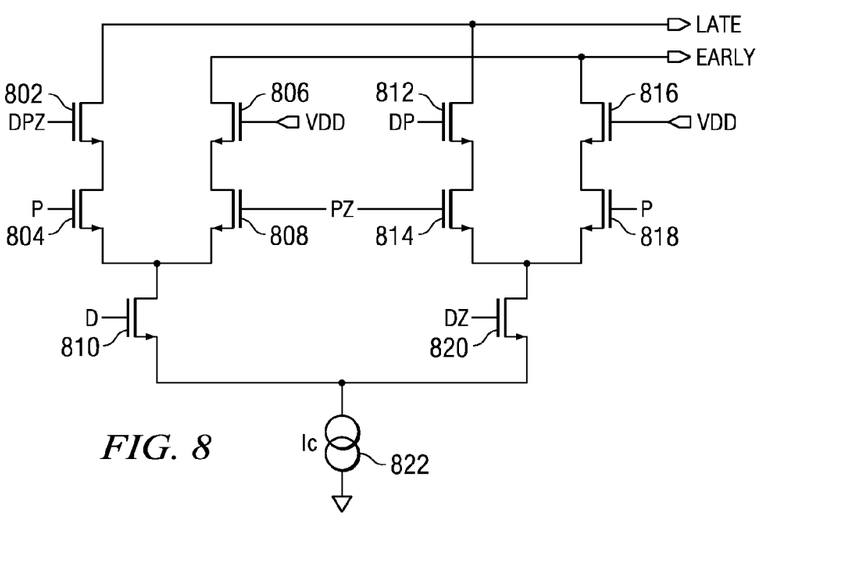
FIG. 8 is a schematic diagram illustrating a voting component in accordance with an aspect of the present invention.

FIG. 8 is a schematic diagram illustrating a voting component in accordance with an aspect of the present invention. The voting component can be employed in the circuit of FIGS. 6 and 7 to selectively draw current corresponding to detected early or late operation of data and transition clocks.

A drain of a first transistor 802 is connected to an early output node and a gate of the first transistor is connected to a logical complement of a previous center sample (DPZ). A drain of a second transistor 804 is connected to a source of the first transistor 802 and has its gate connected to a current edge sample (P). A drain of a third transistor 806 is connected to a late output node and a gate of the third transistor 806 is connected to VDD. A drain of a fourth transistor 808 is connected to a source of the third transistor 806 and a gate of the fourth transistor 808 is connected to a logical complement of the current edge sample (PZ). A drain of a fifth transistor 810 is connected to a source of the second transistor 804 and a source of the fourth transistor 808. A gate of the fifth transistor 810 receives a current center sample (D).

A drain of a sixth transistor 812 is also connected to the early output node and its gate is connected to the previous center sample (DP). A drain of a seventh transistor 814 is connected to a source of the sixth transistor 812. A gate of the seventh transistor 814 is connected to the PZ. A drain of an eighth transistor 816 is connected to the late output node and its gate is connected to VDD. A drain of a ninth transistor 818 is connected to a source of the eighth transistor 816 and a gate of the ninth transistor is connected to the P (current edge sample). A tenth transistor 820 has its drain connected to a source of the seventh transistor 814 and a source of the ninth transistor 818. A gate of the tenth transistor 820 receives a logical complement of the current center sample (DZ).

A reference current circuit 822 is connected to a source of the fifth transistor 810 and a source of the tenth transistor 820. The reference current circuit 822 generates a reference current Ic that can be applied to at most one of the output nodes (the early output node and the late output node) according to the inputs received (D, DZ, DP, DPZ, P, and PZ).

The transistors are turned ON by a positive (+1) input at their gates and turned OFF by a zero or negative (−1) input at their gates. The component outputs a current at the late output node according to a logic equation, D*PZ*DPZ+ DZ*PZ*DP, and outputs a current at the early output node according to another logic equation, D*PZ+DZ*P (DxorP). To "cast" an early vote, the component draws or sinks the reference current through the early output node through selected gates to the reference current circuit 822 and to "cast" a late vote, the component draws or sinks the reference current through the late output node through selected gates to the reference current circuit 822. If a transition has not occurred, then current is not sunk or drawn from the early output node or the late output node (i.e., no current path from either output node is provided to the reference current circuit 822). As an example, if the current sample D is +1, the current edge sample P is +1, and the previous center sample DP is +1, the tenth transistor 820 is turned OFF (due to DZ), the first transistor 802 is turned OFF (due to DPZ), and the fourth transistor 808 is turned OFF (due to PZ) thereby providing no current path from either output node to the reference current circuit 822. As a second example, if the current sample D is −1, the current edge sample P is −1, and the previous center sample DP is −1, the fifth transistor 810 is turned OFF (due to D), the ninth transistor 818 is turned OFF (due to P), and the sixth transistor 812 is turned OFF (due to DP) thereby providing no current path from either output node to the reference current circuit 822.

It is noted that the component of FIG. 8 is configured to "cast a vote" for the early output node, the late output node, or neither. This can be seen by the fifth transistor 810 and the tenth transistor 820. One of which is always turned OFF and the other of which is always turned ON.

Figure 9:
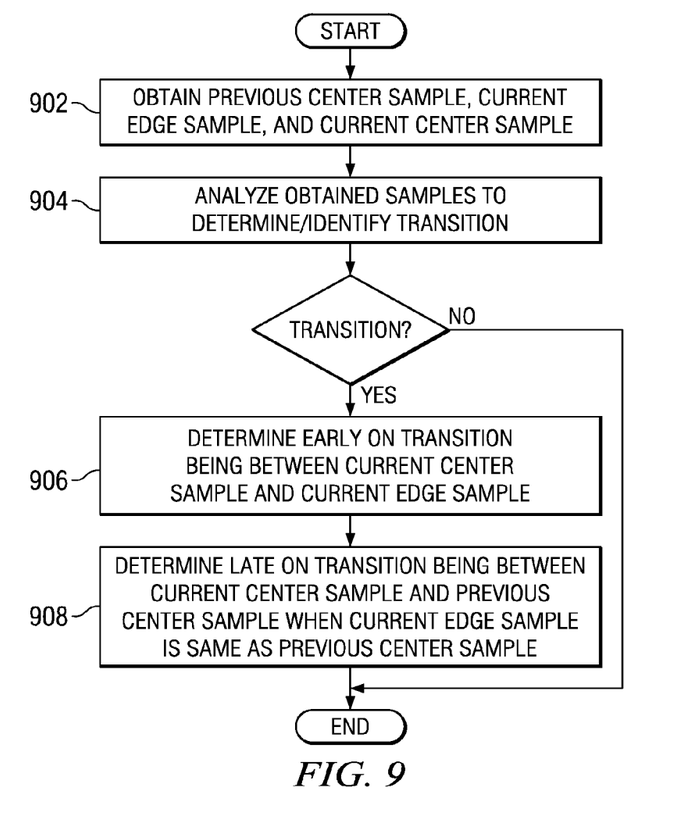
FIG. 9 is a flow diagram illustrating a method of analyzing a bit time to determine if transition and data clocks are early or late for a bit time in accordance with an aspect of the present invention.
Figure 10:
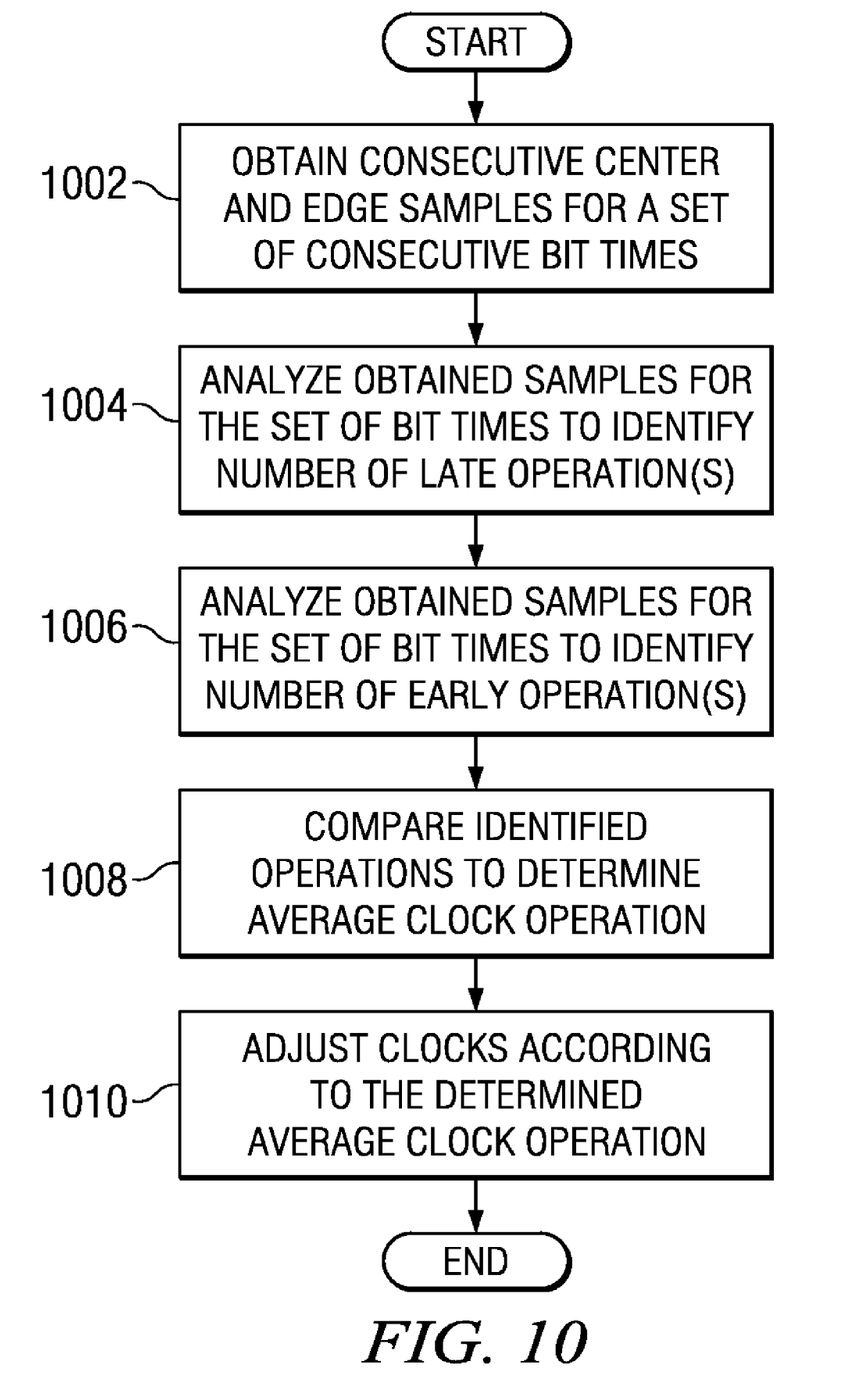
FIG. 10 is a flow diagram illustrating a method of detecting early or late operation of transition and data clocks and adjusting the clocks in accordance with an aspect of the present invention.

In view of the foregoing structural and functional features described supra, methodologies in accordance with various aspects of the present invention will be better appreciated with reference to the above figures. While, for purposes of simplicity of explanation, the methodologies of FIG. 9-10 are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 9 is a flow diagram illustrating a method of analyzing a bit time to determine if transition and data clocks are early or late for a bit time in accordance with an aspect of the present invention.

The method begins at block 902, wherein three consecutive samples of a received serial data stream are obtained, a previous center sample, a current edge sample, and a current center sample. The three samples cover a single bit time. FIGS. 4 and 5, discussed supra, illustrate points at which samples can be obtained from a received serial data stream.

The previous center sample, the current edge sample, and the current center sample are analyzed to determine if a transition has occurred at block 904. A transition is a change in value from one sample to the next, such as a change in one sample of +1 to a next of −1 or a change in one sample of −1 to a next of +1. On a transition occurring between the current center sample and the current edge sample, the method determines that the transition and data clocks are early for this bit time at block 906. On a transition occurring between the current center sample and the previous center sample and the current edge sample being the same as the previous center sample, the method determines that the transition and data clocks are late for this bit time at block 908. If no transition is detected, the method stops for the current bit time. The method can be repeated for other bit times or a set of consecutive bit times to obtain a set of early/late operation determinations.

FIG. 10 is a flow diagram illustrating a method of detecting early or late operation of transition and data clocks and adjusting the clocks in accordance with an aspect of the present invention. The method can be employed by a clock and data recover system that employs a data clock and a transition clock.

The method begins at block 1002, wherein consecutive center and edge samples of a received serial data stream are obtained for a set of consecutive bit times. The edge samples are obtained at or near edges of bit times and the center samples are obtained at or near centers of bit times. The data clock is employed to obtain center samples and the transition clock is employed to obtain edge samples.

The set of consecutive bit times are analyzed at block 1004 to identify late operation(s) of the clocks according to the obtained center and edge samples. For each bit time of the set, a current edge sample, a current center sample, and a previous center sample are analyzed to identify a transition and, if there is a transition, whether the clocks are early or late. The clock(s) are considered late for a bit time if the transition is identified between the previous center sample and the current center sample when the current edge sample is the same as the previous center sample.

The set of consecutive bit times are analyzed at block 1006 to identify early operation(s) of the clocks according to the obtained center and edge samples. For each bit time of the set, a current edge sample, a current center sample, and a previous center sample are analyzed to identify a transition and, if there is a transition, whether the clocks are early or late. The clock(s) for the current bit time are considered early if the transition is identified between the current edge sample and the current center sample.

The identified late operation(s) are compared with the identified early operation(s) to determine average clock operation over the set of consecutive bit times at block 1008. Generally, the average clock operation is simply whether there are more identified early operations or more identified late operations.

Continuing, the clock(s) are adjusted according to the average clock operation at block 1010. As described above, the clocks include a data clock and a transition clock. If the average clock operation is late, the clocks are sped up by a step amount and if the average clock operation is early, the clocks are slowed by a step amount.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A voting component comprising:
    a current center sample input node that receives a current center sample;
    a current edge sample input node that receives a current edge sample;
    a previous center sample input node that receives a previous center sample;
    an early output node that selectively draws a reference current according to the current center sample, the current edge sample, and the previous center sample;
    a late output node that selectively draws the reference current according to the current center sample, the current edge sample, and the previous center sample;
    circuitry for selectively controlling the early output node and the late output node;
    a complement center sample node that receives a logical complement of the current center sample;
    a complement edge sample node that receives a logical complement of the current edge sample; and
    a complement previous center sample node that receives a logical compliment of the previous center sample.

2. The voting component of claim 1, wherein the circuitry comprises:
    a first transistor having a drain connected to the late output node and a gate connected to the complement previous center sample node;
    a second transistor having a drain connected to a source of the first transistor and a gate connected to the current edge sample input node;
    a third transistor having a drain connected the early output node and a gate connected to VDD;
    a fourth transistor having a drain connected to a source of the third transistor and a gate connected to the complement edge sample node;
    a fifth transistor having a drain connected to a source of the second transistor and a source of the fourth transistor and a gate connected to the current center sample input node;
    a sixth transistor having a drain connected to the late output node and a gate connected to the previous center sample input node;
    a seventh transistor having a drain connected to a source of the sixth transistor and a gate connected to the complement edge sample node;
    an eighth transistor having a drain connected to the early output node and a gate connected to VDD;
    a ninth transistor having a drain connected to a source of the eighth transistor and a gate connected to the current edge sample input node;
    a tenth transistor having a drain connected to a source of the seventh transistor and a source of the ninth transistor and a gate connected to the complement center sample node; and
    a reference current circuit connected to a source of the fifth transistor and a source of the tenth transistor that draws the reference current from the early output node or the late output node according to the current center sample, the current edge sample, and the previous center sample.

3. The voting component of claim 1, wherein the circuitry comprises an inverter generates the logical complement of the current center sample from the current center sample.

4. The voting component of claim 1, wherein the early output node selectively draws a reference current based on a logical expression of the current center sample XORed with the current edge sample.

5. A clock recovery device comprising: a sample component that obtains center and edge samples of a serial data stream;
- a number of voting components that identify early and late operation for a set of consecutive bit times of the serial data stream from the obtained center and edge samples and selectively draw a reference current at early and late output nodes according to the identified operation;
- an analyzer that measures and compares current drawn by the number of voting components at the early and late output nodes and indicates an average operation based upon the comparison;
- a data clock and a transition clock, wherein the sample component employs the data clock to obtain center samples and the transition clock to obtain edge samples; and
- wherein the analyzer component adjusts operation of the data clock and the transition clock according to the average operation of the set of consecutive bit times.

6. The device of claim 5, wherein the analyzer comprises:
- a composite early node connected to the early output nodes of the number of voting components;
- a composite late node connected to the late output nodes of the number of voting components;
- a first resistor having a first terminal connected to VDD and a second terminal connected to the composite early node;
- a second resistor having a first terminal connected to VDD and a second terminal connected to the composite late node;
- a third resistor having a first terminal connected to the composite early node;
- a composite early plus node connected to a second terminal of the third resistor;
- a fourth resistor having a first terminal connected to the composite late node;
- a composite late plus node connected to a second terminal of the fourth resistor;
- a first reference current circuit connected to the composite early plus node that draws a half of the reference current;
- a second reference current circuit connected to the composite late plus node that draws a half of the reference current;
- a first comparator that compares a voltage of the composite early node to a voltage of the composite late plus node and generates a early output on the voltage of the composite early node being less than the voltage of the composite late plus node; and
- a second comparator that compares a voltage of the composite plus early node to a voltage of the composite late node and generates a late output on the voltage of the composite late node being less than the voltage of the composite early plus node, wherein the early output and the late output indicate the average operation of the set of consecutive bit times.

7. The device of claim 6, wherein the voting components respectively comprise:
- a current center sample input node that receives a current center sample;
- a current edge sample input node that receives a current edge sample;
- a previous center sample input node that receives a previous center sample;
- an early output node that selectively draws a reference current according to the current center sample, the current edge sample, and the previous center sample;
- a late output node that selectively draws the reference current according to the current center sample, the current edge sample, and the previous center sample;
- a complement center sample node that receives a logical complement of the current center sample;
- a complement edge sample node that receives a logical complement of the current edge sample;
- a complement previous center sample node that receives a logical compliment of the previous center sample
- a first transistor having a drain connected to the early output node and a gate connected to the complement previous center sample node;
- a second transistor having a drain connected to a source of the first transistor and a gate connected to the current edge sample input node;
- a third transistor having a drain connected the late output node and a gate connected to VDD;
- a fourth transistor having a drain connected to a source of the third transistor and a gate connected to the complement edge sample node;
- a fifth transistor having a drain connected to a source of the second transistor and a source of the fourth transistor and a gate connected to the current center sample input node;
- a sixth transistor having a drain connected to the early output node and a gate connected to the previous center sample input node;
- a seventh transistor having a drain connected to a source of the sixth transistor and a gate connected to the complement edge sample node;
- an eighth transistor having a drain connected to the late output node and a gate connected to VDD;
- a ninth transistor having a drain connected to a source of the eighth transistor and a gate connected to the current edge sample input node;
- a tenth transistor having a drain connected to a source of the seventh transistor and a source of the ninth transistor and a gate connected to the complement center sample node; and
- a third reference current circuit connected to a source of the fifth transistor and a source of the tenth transistor that draws the reference current from the early output node and the late output node according to the current center sample, the current edge sample, and the previous center sample.

* * * * *